United States Patent [19]

Robertson et al.

[11] Patent Number: 5,324,432
[45] Date of Patent: Jun. 28, 1994

[54] TREATMENT OF PROCESS WATERS TO DESTROY FILAMENTOUS BACTERIA

[75] Inventors: Linda R. Robertson, St. Charles; Judy G. LaZonby, Crystal Lake; Joseph J. Krolczyk, Lisle; Harley R. Melo, Itasca, all of Ill.

[73] Assignee: Nalco Chemical Company, Naperville, Ill.

[21] Appl. No.: 77,654

[22] Filed: Jun. 17, 1993

[51] Int. Cl.$^5$ ............................ C02F 1/50; C02F 3/28
[52] U.S. Cl. .................................. 210/632; 210/764; 210/928; 162/161; 422/28; 422/37; 435/259; 435/800
[58] Field of Search ................. 210/632, 764, 928; 162/161; 422/28, 37; 435/259, 262.5, 800

[56] References Cited

U.S. PATENT DOCUMENTS

| | | | |
|---|---|---|---|
| 3,824,184 | 7/1974 | Hatcher et al. | 210/632 |
| 4,370,199 | 1/1983 | Orndorff | 162/161 |
| 4,478,683 | 10/1984 | Orndorff | 162/161 |
| 4,684,469 | 8/1987 | Pedersen et al. | 210/632 |
| 4,936,994 | 6/1990 | Wiatr . | |
| 4,981,592 | 1/1991 | Garbutt et al. | 210/606 |
| 5,071,765 | 12/1991 | Wiatr | 435/264 |

*Primary Examiner*—Neil McCarthy
*Attorney, Agent, or Firm*—Hill, Steadman & Simpson

[57] ABSTRACT

The present invention provides a method for inhibiting the growth of filamentous microorganisms. The method includes the steps of adding effective amounts of a biocide and an enzyme. The enzyme of the present invention enhances the leakiness of the protective sheath around the filamentous microorganisms to allow the penetration of the biocide into the cells of the filamentous microorganisms.

17 Claims, No Drawings

TREATMENT OF PROCESS WATERS TO DESTROY FILAMENTOUS BACTERIA

BACKGROUND OF THE INVENTION

The present invention relates generally to controlling the growth of microorganisms. More specifically, the present invention relates to methods for inhibiting the growth of filamentous microorganisms in industrial process waters.

The presence of microorganisms in waters, especially industrial waters, is a never-ending concern for industrial manufacturers. Examples of industrial waters where microorganisms can interfere with industrial processes include cooling tower waters, mining process waters, food processing waters, sugar reprocessing waters, wine and brewery waters and the like.

In particular, the growth of microorganisms in pulp and paper mill waters can adversely affect finished paper products. Paper mills provide extremely good conditions for the growth of microorganisms. The warm temperatures and rich carbohydrate containing fluids of paper machines provide ideal growth conditions for a variety of microorganisms. The contaminating microorganisms are capable of causing spoilage of pulp, furnish, or chemical additives. When deposits break loose and fall into the paper furnish, they result in quality loss or end product defects such as holes and spots. The end result is unsalable paper or paper sold at a lower value. Robertson, The use of phase-contrast microscopy to assess and differentiate the microbial population of a paper mill. TAPPI Journal, p. 83 (March 1993).

The presence of microorganisms within industrial water systems results in the formation of deposits of biological origin on industrial machines. These formation deposits give rise to: corrosion; breaks; increased down time; loss of yield; high chemical costs; odors; and expensive deposit control programs. In the paper mill industry, slime deposits are reportedly responsible for nearly 70% of all breaks, blockages and pump failures. Safade, *Tackling the Slime Problem in a Paper-Mill.* PTI, p. 280 (September 1988). Slime may be defined as an "accretion or accumulation caused by certain microorganisms in the presence of pulp fiber, filler, dirt and other materials, mixed in varied proportions, having variable physical characteristics and accumulating at continuous changing rates." Id.

The conventional method of controlling microbial growth is through the use of biocides. Biocides are generally divided into two main groups: oxidizing; and non-oxidizing. These biocides act on the microorganisms in one of three ways: either by attacking the cell wall; the cytoplasmic membrane; or the cellular constituents. Id. at 282.

While biocides do inhibit microbial growth, economic and environmental concerns require improved methods. A problem with the use of biocides is that high levels of expensive chemicals are needed to control microbial growth. Moreover, such chemicals are highly toxic in the quantities known to be required for effective control of microbial populations. As a result, environmental regulations restrict the amount of biocides that can safely be discarded into the environment.

As an alternative to treatment with biocides, researchers posited the use of enzymes to control slime accumulation. U.S. Pat. No. 3,824,184 to Herbert J. Hatcher relates to the addition of levan hydrolase to industrial waters having a slime accumulation or potential slime problem. Similar to using a mixture of various biocides, the use of a multiple enzyme blend to control industrial slime is also known. See U.S. Pat. No. 5,071,765 to Christopher L. Wiatr.

While a biocide or an enzyme alone inhibits slime growth, researchers report that the combination of a biocide and an enzyme together provides even greater benefits. For example, U.S. Pat. No. 4,684,489 to Pederson et al. relates to the combination of a biocide and a polysaccharide-degrading enzyme to reduce slime accumulations. Past combinations focus on using an enzyme, such as levan hydrolase, to degrade the capsule layer around the cell of the microorganism. However, although the combination of the biocide and the levan hydrolase may provide increased control against some sorts of slime growth, it has no affect on sheathed microorganisms.

Conventional treatments fail to recognize the problems caused by filamentous microorganisms in water systems. A group of microorganisms, including the filamentous bacteria, enter industrial systems via the fresh waters. In a typical treatment program, the proper chlorination of waters is always recommended as a means to kill these microorganisms before they enter the system. Unfortunately, proper chlorination is often not a viable option since many filaments have a protective sheath that protects them from anti-microbial agents. While the industrial biocide/enzyme combinations that are presently available work well in killing unsheathed, nonfilamentous bacteria, they fail to limit or reduce the microbial population of filamentous bacteria. In fact, research has shown that 85% of the paper machine deposit samples for alkaline mills currently show filamentous bacteria as one of the major portions of the deposit matrix.

Therefore, a need exists for improved methods for controlling the growth of filamentous microorganisms in industrial process waters.

SUMMARY OF THE INVENTION

Pursuant to the present invention, the growth of filamentous microorganisms can be inhibited without the use of high levels of certain biocides. The present invention provides a method for inhibiting the growth of filamentous microorganisms in industrial process waters. The method includes the step of adding to the waters effective amounts of a biocide and an enzyme such that the enzyme enhances the kill of the filamentous microorganisms.

Specifically, the biocide functions to inhibit the growth of the filamentous microorganisms. Whereas, the enzyme enhances the kill of the filamentous microorganisms by cleaving holes in the protective sheath surrounding the filamentous microorganisms. Once the protective sheath is opened, the biocide is able to penetrate into the cells of the filamentous microorganisms.

In an embodiment, the biocide and the enzyme are separate components that are added to a water system.

In an embodiment, the enzyme is added prior to the biocide in the water system.

An advantage of the present invention is that it provides an improved method for inhibiting the growth of filamentous microorganisms.

Another advantage of the present invention is that it lowers the level of expensive chemicals needed for inhibiting the growth of filamentous microorganisms.

Still further, an advantage of the present invention is that it not only inhibits the growth of filamentous microorganisms in fresh water systems, it also simultaneously inhibits the accumulation of slime growth on industrial machines.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides, for inhibiting the growth of filamentous microorganisms, a method that includes the addition of a biocide and an enzyme to a fluid system. The biocide component inhibits the growth of the filamentous microorganisms. Whereas, the enzyme component enhances the kill of the filamentous microorganisms. The enzyme cleaves holes in the protective sheath around the filamentous microorganisms and thereby allows the penetration of the biocide into the cells of the filamentous microorganisms.

The biocide component of this invention can include substantially any biocide that can effectively kill the filamentous bacteria. Examples of suitable biocides include thiadiazines such as 3,5-dimethyl-tetrahydro-2H-1,3,5-thiadiazine-2-thione; dithiocarbamates such as sodium dimethyl dithiocarbamate and disodium ethylene bis-dithiocarbamate; thiocyanates such as methylene bis-thiocyanate; and quaternary ammonium chlorides such as alkyl dimethyl benzyl ammonium chloride and dialkyl methyl benzyl ammonium chloride. Other suitable biocides include chlorine; hypochlorite; chlorine dioxide; hydrogen peroxide; peracetic acid; glutaraldehyde; N-4-dihydroxy-alpha-oxobenzene ethanimidoyl chloride; 1-alkyl(C16–18)amino-3-aminopropane acetate; bis(trichloromethyl) sulfone; 5-chloro-2-methyl-4-isothiazolin-3-one; 2-methyl-4-isothiazolin-3-one; 2-(thiocyanomethylthio)-benzothiazole; and bis(trichloromethyl) sulfone. Naturally, mixtures of biocides can also be used.

The biocides can be obtained from a number of chemical suppliers such as American Cyanamid, Buckman, Betz, Dearborn Chemical, Economics Laboratory, Inc., Merck, Nalco Chemical Company, Vineland Chemical, Dow Chemical, Rohm & Haas, Drew, and Union Carbide.

The enzyme component of this invention can be any enzyme that can effectively break the bonds in the protective sheath around the filamentous microorganisms. Effectively, the enzyme enhances the leakiness of the sheath to allow penetration of the biocide. Examples of suitable enzymes include: trypsin; lactase such as beta-galactosidase; endo-protease; chymotrypsin; and carbohydrase.

The ideal enzyme chosen depends on the problem-causing filamentous microorganism within the water system. Specifically, the enzyme chosen depends on the structure of the protective sheath around the particular filamentous microorganism. For example, an ideal combination used to inhibit the growth of filamentous bacterium *Sphaerotilus natans* is 2,2-Dibromo-3-nitrilopropionamide (DBNPA) and trypsin.

The optimal amounts of biocide and enzyme required for effectiveness in this invention depend on the type of industrial waters being treated. In addition, the concentration of the combined components varies greatly and can depend upon the conditions such as temperature and pH of the waters, and the microbial count. With respect to the biocide, the lower and upper limits of the required concentrations substantially depend upon the specific biocide or combination of biocides used. Likewise, with respect to the enzyme, the desired amount of the enzyme depends to a large extent on the activity of the enzyme.

In an embodiment, the method comprises adding approximately 0.5 to 500 ppm of the biocide and approximately 0.01 to 1000 units of the enzyme.

Pursuant to the method of the present invention, the growth of filamentous microorganisms in industrial process waters can be inhibited. The method comprises the step of adding to the waters the enzyme and the biocide of the present invention. In an embodiment, the enzyme and the biocide are separate components that are added to the system.

In a preferred embodiment, the enzyme is added prior to the biocide in order to sufficiently cleave holes in the microorganisms having a sheath. The enzyme can be added pursuant to any known method that provides the desired concentration of the enzyme in the waters. As stated above, the optimal amount of the enzyme depends on the enzyme activity of the particular enzyme added. In an embodiment, approximately 0.01 to 1000 units per ml of the enzyme is added to the water system.

After the controlled addition of the enzyme, the biocide is then added to the water system. Since the enzyme has cleaved holes in the sheath, the biocide is able to enter and kill the microorganisms. Similar to the enzyme addition, the biocide can be added pursuant to any known method that provides the desired concentration of biocide in the waters. In an embodiment, approximately 0.5 to 500 ppm of the biocide is added to the water system.

By way of example, and not limitation, a contemplative example of the invention will now be given.

CONTEMPLATIVE EXAMPLE

The following procedure is believed applicable for the treatment of filamentous bacterium *Sphaerotilus natans* in water systems. Initially, approximately 0.01 to 25 units of a protease such as trypsin is mixed with approximately 0.01 to 25 units of a carbohydrase such as beta-galactosidase. These enzymes are contacted with the filamentous bacteria for about 1 to 15 minutes, prior to adding the biocide. The contact period provides sufficient time for the enzymes to cleave holes in the protective sheath of the filamentous bacterium *Sphaerotilus natans*.

Next, approximately 0.01 to 5 ppm of a biocide such as hypochlorite is added to the water system. The biocide is allowed to contact for about 3 to 30 minutes. The biocide, as opposed to the enzyme, actually kills the cells of the filamentous bacteria.

Standard detection methods are then utilized to determine the percent reduction of microbial activity. Methods such as microscopy, ATP (adenosine triphosphate) analysis, and INT-redox are suitable in the present invention. It is believed the combination of the biocide and enzyme will reduce microbial activity by greater than fifty percent compared to previous methods.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for inhibiting the growth of filamentous bacteria in industrial process waters comprising the steps of adding to the waters a sufficient amount of a protease enzyme so that the protease enzyme will open a sheath that surrounds the filamentous bacteria and a sufficient amount of a biocide for penetrating the filamentous bacteria and killing the same.

2. The method of claim 1 wherein the industrial process waters are part of a pulp and paper mill system.

3. The method of claim 1 wherein the enzyme is added prior to the biocide.

4. The method of claim 1 wherein the amount of biocide ranges from approximately 0.5 to 500 ppm and the enzyme ranges from about 0.01 to 1000 units.

5. The method of claim 1 wherein the enzyme and the biocide are added simultaneously.

6. The method of claim 1 wherein the biocide is selected from the group consisting of: chlorine; hypochlorite; bromine; chlorine dioxide; hydrogen peroxide; peracetic acid; a thiadizine; a dithiocarbamate; a thiocyanate; a quaternary ammonium chloride; glutaraldehyde; N-4-dihydroxy-alpha-oxobenzene ethanimidoyl chloride; 1-alkyl(C16–18)amino-3aminopropane acetate; bis(trichloromethyl) sulfone; 5-chloro-2-methyl-4-isothiazolin-3-one; 2-methyl-4-isothiazolin-3-one; 2-(thiocyanomethylthio)benzothiazole; bis(trichloromethyl) sulfone; and mixtures thereof.

7. The method of claim 1 wherein the protease enzyme is selected from the group consisting of: trypsin; endo-protease; chymotrypsin; and mixtures thereof.

8. A method for enhancing the kill of filamentous bacteria in a pulp and paper mill water system comprising adding along with a biocide to the pulp and paper mill water system a protease enzyme that opens a sheath of the filamentous bacteria allowing the biocide to penetrate and kill the filamentous bacteria.

9. The method of claim 8 wherein the enzyme is added prior to the biocide.

10. The method of claim 8 wherein the amount of biocide added ranges from approximately 0.5 to 500 ppm and the enzyme added ranges from approximately 0.01 to 1000 units.

11. The method of claim 8 wherein the biocide is selected from the group consisting of: chlorine; hypochlorite; chlorine dioxide; hydrogen peroxide; peracetic acid; a thiadizine; a dithiocarbamate; a thiocyanate; a quaternary ammonium chloride; glutaraldehyde; N-4-dihydroxy-alpha-oxobenzene ethanimidoyl chloride; 1-alkyl(C16–18)amino-3-aminopropane acetate; bis(trichloromethyl) sulfone; 5-chloro-2-methyl-4-isothiazolin-3-one; 2-methyl-4-isothiazolin-3-one; 2-(thiocyanomethylthio)benzothiazole; bis(trichloromethyl) sulfone; and mixtures thereof.

12. The method of claim 8 wherein the enzyme is selected from the group consisting of: trypsin; endo-protease; chymotrypsin; and mixtures thereof.

13. A method for inhibiting the growth of filamentous bacteria having a sheath in industrial process waters comprising the steps of adding to the waters a sufficient amount of a protease enzyme selected from the group consisting of trypsin, endo-protease, chymotrypsin, and mixtures thereof, so that the enzyme will open the sheath around the filamentous bacteria; and a sufficient amount of a biocide selected from the group consisting of hydrogen peroxide, peracetic acid, chlorine, chlorine dioxide, hypochlorite, a thiadizine, a dithiocarbamate, a thiocyanate, a quaternary ammonium chloride, glutaraldehyde, N-4-dihydroxy-alpha-oxobenzene ethanimidoyl chloride, 1-alkyl(C16–18)amino-3-aminopropane acetate, bis(trichloromethyl) sulfone, 5-chloro-2-methyl-4-isothiazoline-3-one, 2-methyl-4-isothiazolin-3-one, 2-(thiocyanomethylthio)-benzothiazole, bis(trichloromethyl) sulfone, and mixtures thereof, for penetrating the filamentous bacteria and killing the same.

14. The method of claim 13 wherein the industrial process waters are part of a pulp and paper mill system.

15. The method of claim 13 wherein the enzyme is added prior to the biocide.

16. The method of claim 13 wherein the amount of biocide ranges from approximately 0.5 to 500 ppm and the enzyme ranges from about 0.01 to 1000 units.

17. The method of claim 13 wherein the enzyme and the biocide are added simultaneously.

* * * * *